United States Patent
Ginsberg et al.

(10) Patent No.: US 8,239,244 B2
(45) Date of Patent: Aug. 7, 2012

(54) SYSTEM AND METHOD FOR TRANSACTION LOG CLEANSING AND AGGREGATION

(75) Inventors: David Ginsberg, Scottsdale, AZ (US);
Kenneth Ouimet, Scottsdale, AZ (US);
Neil Primozich, Scottsdale, AZ (US);
Prashant Warier, Scottsdale, AZ (US)

(73) Assignee: SAP AG, Walldorf (DE)

( * ) Notice: Subject to any disclaimer, the term of this patent is extended or adjusted under 35 U.S.C. 154(b) by 1034 days.

(21) Appl. No.: 11/947,979

(22) Filed: Nov. 30, 2007

(65) Prior Publication Data
US 2009/0144122 A1 Jun. 4, 2009

(51) Int. Cl.
*G06F 17/00* (2006.01)
(52) U.S. Cl. .................................................. 705/7.31
(58) Field of Classification Search ............ 705/10, 705/7.31
See application file for complete search history.

(56) References Cited

U.S. PATENT DOCUMENTS

| | | | |
|---|---|---|---|
| 7,240,027 B2 | 7/2007 | McConnell et al. | |
| 2001/0049690 A1 | 12/2001 | McConnell et al. | |
| 2002/0046113 A1* | 4/2002 | Pisano et al. | 705/14 |
| 2002/0123957 A1* | 9/2002 | Notarius et al. | 705/37 |
| 2007/0124216 A1* | 5/2007 | Lucas | 705/27 |
| 2008/0086429 A1 | 4/2008 | Venkatraman et al. | |

* cited by examiner

*Primary Examiner* — Thomas Dixon
(74) *Attorney, Agent, or Firm* — Buckley, Maschoff & Talwalkar LLC (57) ABSTRACT

A computer-implemented method prepares data for modeling. The method comprises storing data from customer sales transactions in a database and retrieving a dataset of the data from the database. The dataset may include promotion and merchandizing entries. The method includes cleansing the dataset to remove erroneous and anomalous entries. Cleansing the dataset may include determining a threshold value from the dataset and determining whether a value of the dataset exceeds the threshold value, and determining an out-of-stock status for a product from the dataset. The method includes aggregating the dataset over a plurality of dimensions of the transactional space including store, product, and time dimensions, and analyzing the dataset following the cleansing and aggregating steps within a model to predict attributes of subsequent sales transactions.

42 Claims, 2 Drawing Sheets

SYSTEM AND METHOD FOR TRANSACTION LOG CLEANSING AND AGGREGATION

FIELD OF THE INVENTION

The present invention relates in general to economic modeling and, more particularly, to a system and method for cleansing and aggregating transaction log data.

BACKGROUND OF THE INVENTION

Economic and financial modeling and planning is commonly used to estimate or predict the performance and outcome of real systems, given specific sets of input data of interest. An economic-based system will have many variables and influences which determine its behavior. A model is a mathematical expression or representation which predicts the outcome or behavior of the system under a variety of conditions. In one sense, it is relatively easy to review historical data, understand its past performance, and state with relative certainty that the system's past behavior was indeed driven by the historical data. A much more difficult task is to generate a mathematical model of the system which predicts how the system will behave with different sets of data and assumptions.

In its basic form, the economic model can be viewed as a predicted or anticipated outcome of a mathematical expression, as driven by a given set of input data and assumptions. The input data are processed through the mathematical expression representing either the expected or current behavior of the real system. The mathematical expression is formulated or derived from principles of probability and statistics, often by analyzing historical data and corresponding known outcomes, to achieve a best fit of the expected behavior of the system to other sets of data. In other words, the model should be able to predict the outcome or response of the system to a specific set of data being considered or proposed, within a level of confidence, or an acceptable level of uncertainty.

Economic modeling has many uses and applications. One area in which modeling has been applied is in the retail environment. Grocery stores, general merchandise stores, specialty shops, and other retail outlets face stiff competition for limited customers and business. Most if not all retail stores expend great effort to maximize sales, volume, revenue, and profit. Economic modeling can be a very effective tool in helping the store owners and managers achieve these goals.

Economic modeling typically requires large amounts of data. In the retail environment, the data is collected at the completion of the transaction, usually during the check-out process. The transactional log (T-LOG) data contains information about the items purchased, time and date of purchase, store, price, promotions, customer attributes, and so on. The T-LOG data is stored in a database for use by the retailer in generating and utilizing the models.

If a model is applied directly to the raw T-LOG data, the analysis is performed on each separate entry in T-LOG. If the analysis is directed to a single product selling in a particular store during a specified time period, and that product has relatively slow sales, there may only be a minimal number of data points on which to perform the analysis. If there are too few data points, the model will have insufficient data to perform a robust analysis and the predictions will be inaccurate and largely influenced by random factors. Alternatively, it is possible to have too much data to analyze efficiently. To generate statistically robust models, therefore, a sufficient and manageable volume of data is required.

SUMMARY OF THE INVENTION

In one embodiment, the present invention is a computer-implemented method of preparing data for modeling, comprising storing data from customer sales transactions in a database, retrieving a dataset of the data from the database, cleansing the dataset to remove erroneous and anomalous entries, aggregating the dataset over a plurality of dimensions of the transactional space including store, product, and time dimensions, and analyzing the dataset following the cleansing and aggregating steps within a model to predict attributes of subsequent sales transactions.

In another embodiment, the present invention is a method of preparing data for modeling, comprising retrieving a dataset from a database. The dataset includes data from customer sales transactions. The method includes cleansing the dataset to remove erroneous and anomalous entries, aggregating the dataset over a plurality of dimensions of the transactional space including store, product, and time dimensions, and transmitting the dataset to a modeling system. The modeling system predicts attributes of subsequent sales transactions.

In yet another embodiment, the present invention is a computer program product usable with a programmable computer processor having a computer readable program code embodied therein, comprising computer readable program code which stores data from customer sales transactions in a database, computer readable program code which retrieves a dataset of the data from the database, computer readable program code which cleanses the dataset to remove erroneous and anomalous entries, computer readable program code which aggregates the dataset over a plurality of dimensions of the transactional space including store, product, and time dimensions, and computer readable program code which analyzes the dataset within a model to predict attributes of subsequent sales transactions.

In another embodiment, the present invention is a computer system for manipulating data, comprising means for retrieving a dataset from a database. The dataset includes data from customer sales transactions. The system includes means for cleansing the dataset to remove erroneous and anomalous entries, means for aggregating the dataset over a plurality of dimensions of the transactional space including store, product, and time dimensions, and means for transmitting the dataset to a modeling system. The modeling system predicts attributes of subsequent sales transactions.

DETAILED DESCRIPTION OF THE DRAWINGS

The present invention is described in one or more embodiments in the following description with reference to the Figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Economic and financial modeling and planning is an important business tool that allows companies to conduct business planning, forecast demand, model revenue, and optimize price and profit. Economic modeling is applicable to many businesses such as manufacturing, distribution, retail, medicine, chemicals, financial markets, investing, exchange rates, inflation rates, pricing of options, value of risk, research and development, and the like. In the face of mounting competition and high expectations from investors, most if not all businesses must look for every advantage they can muster in maximizing market share and profits. The ability to forecast demand, in view of pricing and promotional alternatives, and to consider other factors which materially affect overall revenue and profitability is vital to the success of the bottom line, and the fundamental need to not only survive but to prosper and grow.

In particular, economic modeling is essential to businesses that face thin profit margins, such as general customer merchandise and other retail outlets. Many businesses are interested in economic modeling and forecasting, particularly when the model provides a high degree of accuracy or confidence. Such information is a powerful tool and highly valuable to the business.

Before a large volume of data is modeled, however, it must first be manipulated so that it can be used or consumed by the modeling system. The manipulation may include data normalization, data cleansing, data compression or aggregation, filtering, and the calculation of the data's standard deviation and/or confidence intervals. These and other preliminary activities render the data more easily analyzed and make modeling more efficient and more accurate.

The present T-LOG data processing system prepares a dataset for modeling using two separate steps that may be run concurrently or in series. In alternative embodiments, each step may be executed independently without the other step.

The first step involves data cleansing. The data cleansing step removes erroneous and anomalous data entries from the data to be analyzed. The second step involves data aggregation or compression. Here, a large volume of data may be compressed into a smaller volume of data that, to some degree, summarizes the larger data set. The smaller volume of data allows for easier data analysis and more efficient and accurate modeling. Although compressing the data, the data aggregation step minimizes information loss allowing for thorough and robust modeling of the original data set.

Figure 1:
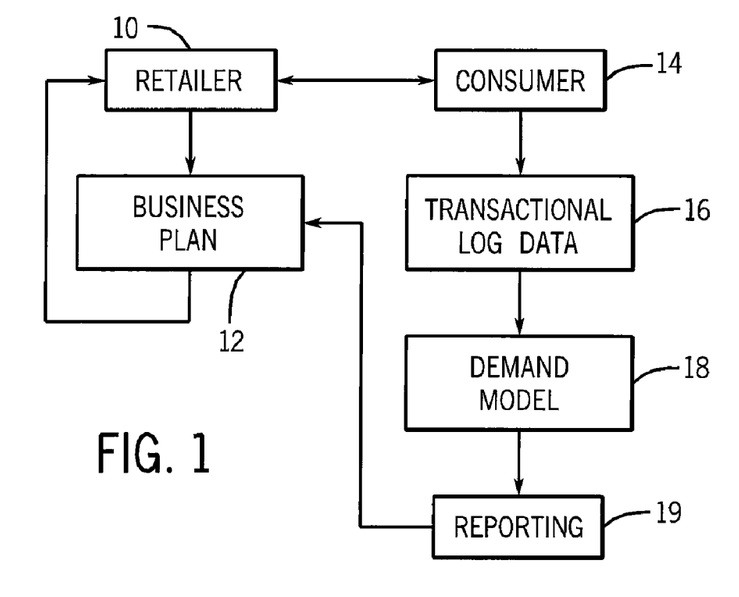
FIG. 1 is a block diagram of a system for cleansing and aggregating transaction log data.

Referring to FIG. 1, retailer 10 has certain product lines or services available to customers as part of its business plan 12. The terms products and services are interchangeable in the present application. Retailer 10 may be a food store chain, general customer product retailer, drug store, discount warehouse, department store, specialty store, or service provider. Retailer 10 has the ability to set pricing, order inventory, run promotions, arrange its product displays, collect and maintain historical sales data, and adjust its strategic business plan. While the present discussion will center around retailer 10, it is understood that the system described herein is applicable to data analysis in other industries and businesses having similar goals, constraints, and needs.

Business plan 12 includes many planning, analyzing, and decision-making steps and operations. Business plan 12 gives retailer 10 the ability to evaluate performance and trends, make strategic decisions, set pricing, order inventory, formulate and run promotions, hire employees, expand stores, add and remove product lines, organize product shelving and displays, select signage, and the like. Business plan 12 allows retailer 10 to analyze data, evaluate alternatives, run forecasts, and make operational decisions. Retailer 10 can change business plan 12 as needed.

Retailer 10 routinely enters into sales transactions with customers 14. In fact, retailer 10 maintains and updates its business plan 12 to increase the number of transactions between retailer 10 and customer 14. Customer 14 can be a specific individual, account, or business entity. Also, customer 14 may belong to one or more specific category defined by retailer 10. Categories may be delineated by senior citizenship status, student status, professional status, residence location, or a category of customers 14 exposed to particular promotional efforts by retailer 10.

For each sales transaction entered into between retailer 10 and customer 14, information describing the transaction is stored in the transaction log (T-LOG) 16. When a customer goes through the cash register at a grocery or any other retail store, each of the items to be purchased is scanned and data is collected and stored by a point-of-sale system, or other suitable data storage system, in T-LOG 16. The data includes the then current price, promotion and merchandising information associated with the product along with the units purchased, and the dollar sales. The date and time, and store and customer information corresponding to that purchase are also recorded.

T-LOG 16 contains one or more line items for each retail transaction, such as shown in Table 1. Each line item includes information such as store number, product number, time of transaction, transaction number, quantity, current price, profit, promotion number, and customer or customer category number. The store number identifies a specific store; product number identifies a product; time of transaction includes date and time of day; quantity is the number of units of the product; current price (in US dollars) can be the regular price, reduced price, or higher price in some circumstances; profit is the difference between current price and cost of selling the item; promotion number identifies any promotion associated with the product, e.g., flyer, ad, sale price, coupon, rebate, end-cap, etc; customer identifies the customer by type, class, region, or individual, e.g., discount card holder, government sponsored or under-privileged, volume purchaser, corporate entity, preferred customer, or special member. T-LOG 16 is accurate, observable, and granular product information based on actual retail transactions within the store. T-LOG 16 represents the known and observable results from the customer buying decision or process. T-LOG 16 may contain thousands of transactions for retailer 10 per store per day, or millions of transactions per chain of stores per day.

TABLE 1

T-LOG Data

| Store | Product | Time | Trans | Qty | Price | Profit | Promotion | Customer |
|-------|---------|------|-------|-----|-------|--------|-----------|----------|
| S1 | P1 | D1 | T1 | 1 | 1.50 | 0.20 | PROMO1 | C1 |
| S1 | P2 | D1 | T1 | 2 | 0.80 | 0.05 | PROMO2 | C1 |
| S1 | P3 | D1 | T1 | 3 | 3.00 | 0.40 | PROMO3 | C1 |
| S1 | P4 | D1 | T2 | 4 | 1.80 | 0.50 | 0 | C2 |
| S1 | P5 | D1 | T2 | 1 | 2.25 | 0.60 | 0 | C2 |
| S1 | P6 | D1 | T3 | 10 | 2.65 | 0.55 | PROMO4 | C3 |
| S1 | P1 | D2 | T1 | 5 | 1.50 | 0.20 | PROMO1 | C4 |

TABLE 1-continued

T-LOG Data

| Store | Product | Time | Trans | Qty | Price | Profit | Promotion | Customer |
|---|---|---|---|---|---|---|---|---|
| S2 | P7 | D3 | T1 | 1 | 5.00 | 1.10 | PROMO5 | C5 |
| S2 | P1 | D3 | T2 | 2 | 1.50 | 0.20 | PROMO1 | C6 |
| S2 | P8 | D3 | T2 | 1 | 3.30 | 0.65 | 0 | C6 |

The first line item shows that on day/time D1, store S1 had transaction T1 in which customer C1 purchased one product P1 at $1.50. The next two line items also refer to transaction T1 and day/time D1, in which customer C1 also purchased two products P2 at $0.80 each and three products P3 at price $3.00 each. In transaction T2 on day/time D1, customer C2 has four products P4 at price $1.80 each and one product P5 at price $2.25. In transaction T3 on day/time D1, customer C3 has ten products P6 at $2.65 each, in his or her basket. In transaction T1 on day/time D2 (different day and time) in store S1, customer C4 purchased five products P1 at price $1.50 each. In store S2, transaction T1 with customer C5 on day/time D3 (different day and time) involved one product P7 at price $5.00. In store S2, transaction T2 with customer C6 on day/time D3 involved two products P1 at price $1.50 each and one product P8 at price $3.30.

Table 1 further shows that product P1 in transaction T1 had promotion PROMO1. PROMO1 may be any suitable product promotion such as a front-page featured item in a local advertising flyer. Product P2 in transaction T1 had promotion PROMO2 as an end-cap display in store S1. Product P3 in transaction T1 had promotion PROMO3 as a reduced sale price. Product P4 in transaction T2 on day/time D1 had no promotional offering. Likewise, product P5 in transaction T2 had no promotional offering. Product P6 in transaction T3 on day/time D1 had promotion PROMO4 as a volume discount for 10 or more items. Product P7 in transaction T1 on day/time D3 had promotion PROMO5 as a 0.50 rebate. Product P8 in transaction T2 had no promotional offering. A promotion may also be classified as a combination of promotions, e.g., flyer with sale price or end-cap with rebate.

Retailer 10 may also provide additional information to T-LOG 16 such as promotional calendar and events, store set-up, shelf location, end-cap displays, flyers, and advertisements. The information associated with a flyer distribution, e.g., publication medium, run dates, distribution, product location within flyer, and advertised prices, is stored within T-LOG 16.

After the data is captured, a data cleansing and aggregation block 17 retrieves transactional data from T-LOG 16, and prepares it for modeling. In the present embodiment, T-LOG 16 is first cleansed by removing erroneous or anomalous data. In a second step, the data is aggregated over one or more of the data's dimensions.

With the dataset from T-LOG 16 properly prepared, any suitable modeling method or algorithm may be used to analyze the data. The model 18 may use a combination of linear, nonlinear, deterministic, stochastic, static, or dynamic equations or models for analyzing T-LOG 16 or aggregated T-LOG 16 data and making predictions about future transactions. Model 18 may be used to generate price and unit sales forecasting, price optimization, promotion optimization, assortment optimization, and merchandize and assortment planning. The model 18 has a suitable output system that enables the output from model 18 to be retrieved and analyzed for updating business plan 12.

Figure 2:
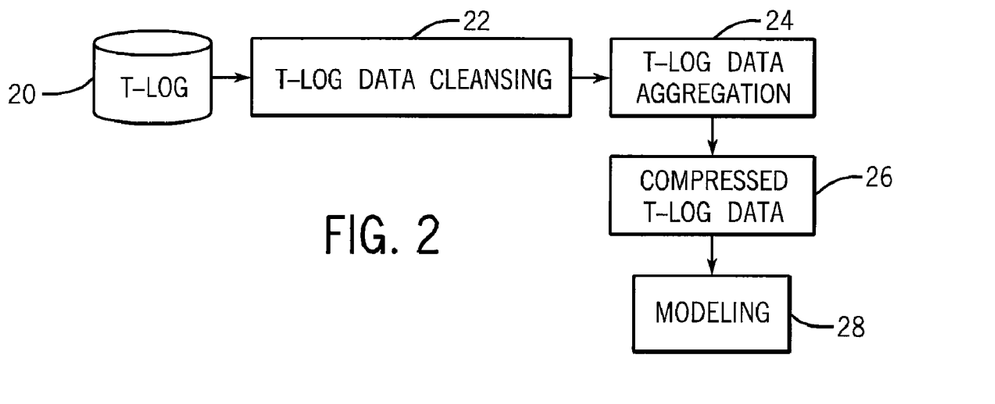
FIG. 2 is a block diagram depicting a method of data cleansing and data aggregation.

FIG. 2 discloses further detail of the cleansing and aggregating process. Database 20 or other data storage system contains T-LOG 16. In a first step, transactional data from T-LOG 16 is retrieved from or made available by database 20. T-LOG data cleansing 22 removes outliers, erroneous data, and anomalous data from T-LOG 16.

After T-LOG 16 is cleansed, the transactional data is compressed and aggregated in T-LOG data aggregation 24 so that it may be more easily used or consumed by model 28. In T-LOG data aggregation 24, several variables describing the T-LOG 16 data are determined. The variables include the number of customers having a transaction at a particular store, a product's out-of-stock status, and the overall availability of a particular product. Also, during T-LOG data aggregation 24, the data is aggregated one or more times over one or more dimensions. T-LOG 16 includes the variables customer, store, product and time of transaction, each of which constitute a dimension over which T-LOG 16 may be aggregated. However, T-LOG 16 may be aggregated over any other variable contained within T-LOG 16.

After cleansing and aggregation, compressed T-LOG dataset 26 is generated. The dataset is then analyzed in model 28. The model analyzes the dataset following the cleansing and aggregating steps to predict attributes of subsequent sales transactions. As described above, any suitable model 28 may be run against compressed T-LOG data 26 to characterize the transactions described therein and to make predictions about product attributes and customer behavior in future sales transactions.

Figure 3:
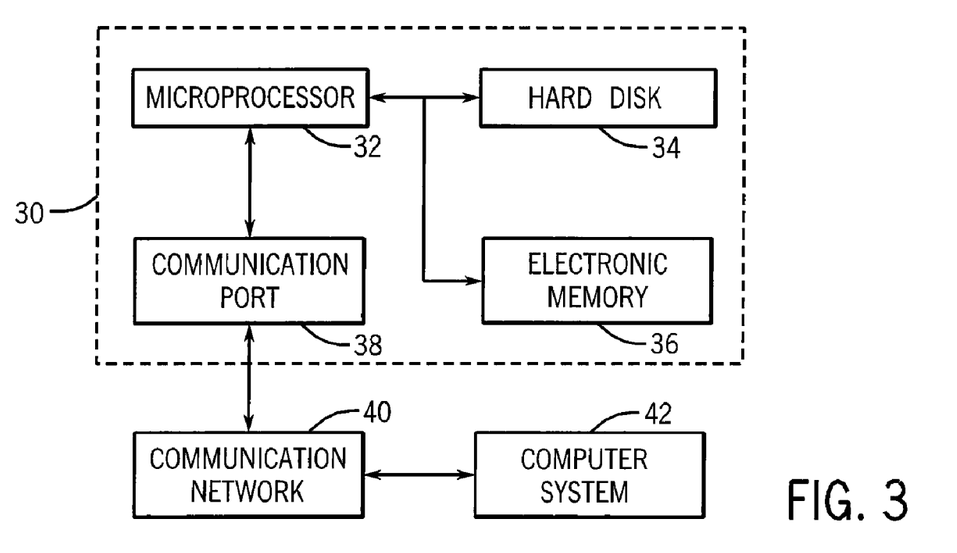
FIG. 3 is a computer system for storing transaction log data and executing a method for cleansing and aggregating transaction log data.

Turning to FIG. 3, a general purpose computer 30 is provided for executing software instructions. General purpose computer 30 further includes communication systems that allow the computer to communicate via a network with other electronic devices such as other computers, barcode scanners, database storage systems, and the like.

General purpose computer 30 includes central processing unit or microprocessor 32, mass storage device or hard disk 34, electronic memory 36, and communication ports 38. Computer 30 runs application software for T-LOG data cleansing 22 and T-LOG data aggregation 24. In alternative embodiments, computer 30 may also execute model 28.

Each product involved in a transaction includes a Universal Product Code (UPC) or barcode label. The barcode is encoded with a unique identification number for the product. The product is scanned over a barcode reader at the store checkout counter to read the UPC identification number. The barcode reader transfers the UPC data to computer 30. Computer 30 may be part of a communication network 40 which connects multiple computer systems 42 and barcode readers in many stores to computer system 30.

From the UPC data, a product database on hard disk 34 retrieves the price for the product and any associated data. As each product from customer 14's basket is scanned, computer 30 builds up a transaction entry in temporary file space on hard disk 34. Once the transaction is complete and customer 14 has paid, the transaction becomes a permanent record in the sales transaction log or database on hard disk 34, or as part of computer system 30.

Another product feature which can be used by retailer 10 to capture data is radio frequency identification tags (RFID). The RFID tag can be attached to products to track time dependent status such as date codes, inventory, and shelf stock. The RFID contains product information such as individual product identification, time, and location. The RFID information is transmitted to a receiving unit which interfaces with the store's computer system. Retailer 10 can track shelf life for perishable items and manage product rotation, ordering, inventory, and sales over time. If a quantity of perishable product is nearing its end of shelf life, then that product is a prime candidate for promotion to move the about-to-expire items. It is much more efficient for retailer 10 to discount the product rather than have to destroy the merchandise. Retailer 10 will also know when inventory is low due to the promotion and needs to be restocked or more products ordered. The location of the RFID tagged product can be monitored to see how display location within the store affects product sales. The time of the sale, e.g., day, month, year, is important in determining the distribution of the unit sales over time. The RFID information represents useful observable data.

Communication port 38 may connect by a high-speed Ethernet link to communication network 40. Communication network 40 may have dedicated communication links between multiple computers, or an open architecture system such as the World Wide Web, commonly known as the Internet. Retailer 10 can access computer 30 remotely through communication network 40.

In one embodiment, the data cleansing and aggregation system is application software or a computer program residing on computer 30, computer system 42, or other network 40 accessible computer system. The software is originally provided on computer readable media, such as compact disks (CDs), or downloaded from a vendor website, and installed on the desired computer. In one case, the system can be executed directly on computer 30, which may be located in the facilities of retailer 10. Retailer 10 interacts with computer 30 through a user control panel, which may take the form of a local computer terminal, to run the system. Alternatively, retailer 10 uses computer system 42 to access the system remotely, e.g., through a website contained on hard disk 34. Retailer 10 can make requests of a third party who in turn runs the system and generates reports on behalf of retailer 10. The remote requests to execute the system may be made to the third party through the website or other communication medium.

After it is prepared, any suitable model may be used to analyze T-LOG 16 and generate forecasts based upon the data. The description of the following generic model does not limit the types of modeling applications that may use data that is cleansed and/or aggregated. The model analyses T-LOG 16 and/or cleansed and aggregated T-LOG 16 to make useful predictions about future transactions. In this manner, T-LOG 16 can be used to predict how much a customer would be willing to pay for a product, or which items to put on promotion, or to forecast the sales of a product at a particular store over a given time period. In short, vast amounts of useful information can be extracted from T-LOG 16. An exemplary model is shown in equation (1).

$$\text{Unit Sales} = f(\text{customer}, \text{store}, \text{product}, \text{time}, \text{price}, \text{promotion}, \text{merchandizing}) \quad (1)$$

In equation (1), f is a generic function of the variables customer, store, product, price, promotion, and merchandizing. Among these variables, the variables customer, store, product, price, promotion, merchandising, and time can be classified as "dimensions". Although in alternative embodiments other variables may be defined as dimensions of the transactional space. Of course, retailer 10 may choose to specify other variables as being in the dimensional space. In the present embodiment, the combination of a particular price, promotion, and merchandising at a store, time, product, and customer dimension will be called an "event".

Models for retail sales generally break up the function f into two separate elements for ease of modeling. The first part, $\tau$, is an expression of the number of customers who had access to a product at a particular store at a particular time and at a given price, promotion, and merchandising. Accordingly, $\tau$ describes the number of customers that have access to a product at each point within the transactional space. The second part, g, is an expression of the sales per customer at that product, store, and time dimension at the given price, promotion, and merchandising. The term g may include further terms which quantify sales, or quantify probabilities.

Accordingly, in the present embodiment, unit sales or dollar sales may be modeled in equation (2) as:

$$\text{Unit Sales}_{c,s,t,pri,pro,m}^{p} = \tau_{c,s,p,t,pri,pro,m} \times g_{c,s,p,t}(pri,pro,m) \quad (2)$$

where: p denotes product c denotes customer t denotes time s denotes store pri denotes price pro denotes promotion m denotes merchandizing Note that many sales models can be expressed in the form shown in equation (2). The variable $\tau$ contains terms which are calculated from T-LOG 16, while g contains terms which are estimated using a suitable model.

In the present embodiment $\tau$ will be either 0 or 1 depending upon whether the product is available at the given price, promotion, and merchandizing at the store, customer, and time dimensional space. g is a probability-based measure with several parameters that determine the total sales for a certain product at the given price, promotion, and merchandizing at the store, customer, and time dimensional space. When applying a suitable model, T-LOG 16 and historical values of $\tau$ will be used to determine the parameters of g. The model, using the pre-calculated parameters of g and forecasted values of $\tau$, can then forecast future sales.

When analyzing aggregated T-LOG 16 data, however, $\tau$ need not be restricted to the values 1 and 0 as it was when analyzing the raw data in T-LOG 16. Instead it will be a measure of the number of customers who could have access to the event over that dimension group. In the present embodiment, when analyzing aggregated T-LOG 16 data, $\tau$ will be referred to as "constrained traffic".

In this case, the term g measures the total sales resulting from the sale of the product at that event over the aggregated dimensional space. Note that in the present embodiment, $\tau$ is a number that can be determined from T-LOG 16 and g is a parametric function whose parameters will be estimated through modeling. When T-LOG 16 data is aggregated over the dimensions time, store, and customer in equation (2), the expression of unit sales becomes:

$$\text{Unit Sales}_{tg,sg,cg}^{p} = \sum_{t \in tg, s \in sg, c \in cg} \tau_{c,s,p,t,pri,pro,m} \times g_{c,s,p,t}(pri, pro, m) \quad (3)$$

where: cg denotes customer groups sg denotes store groups tg denotes time groups g is a parametric function When summed over stores, times, or customers having similar parameters, g can be taken out of the summation. In the present embodiment, dimensions are aggregated so that the parameter values for each entry in a group are approximately equal. Accordingly, in the present embodiment, after aggregation, equation (2) can be expressed as:

$$\text{Unit Sales}^p_{tg,sg,cg} = g_{cg,sg,tg}(pri, pro, m) \times \sum_{t \in tg, s \in sg, c \in cg} \tau_{c,s,p,t,pri,pro,m} \quad (4)$$

$$= g_{cg,sg,tg}(pri, pro, m) \times \tau_{p,cg,sg,tg,pri,pro,m}$$

If the model is applied to each individual product, the product dimension is not aggregated. However, if the product dimension is aggregated, the model is applied for each product group instead of each individual product.

In the present embodiment, equations (2) and (4) describe generic versions of models that may be used for sales modeling. Given an aggregated dataset from T-LOG 16, any suitable modeling algorithm, tool, equation, or system may be used to analyze and/or characterize the data. Accordingly, any and all retail sales models, may be used to analyze T-LOG 16 or aggregated T-LOG 16.

The following discussion presents existing methods of data cleansing and aggregation. The methods are generally known and establish the basic mathematical principles and mechanisms by which the present system operates. In most applications, however, these general methods have several shortcomings that result in inaccurate or incomplete aggregated data and resulting models. The models and their shortcomings are illustrated with several specific examples.

Aggregation of T-LOG 16 may involve summing up dollar and unit sales over one or more suitable dimension such as time, store, product, and customer. For example, time can be aggregated to weeks, stores can be aggregated into store groups, products can be aggregated into product groups and customers can be aggregated into customer groups. If T-LOG 16 is aggregated by week, store, and customer for each type of promotion and merchandizing, the resulting set of aggregated data will be the dollar sales and unit sales of a single product in a store group during a week for a given promotion type.

Table 2 shows data available from a sample T-LOG 16. The table contains data for sales at a single store (A) of a single type of product (P1) at various times, prices, promotions and to various customers. Table 3 shows the data having been aggregated by day. Accordingly, in Table 3 all sales that took place on the same day and having the same product and promotion code are combined. Table 4 shows the data further aggregated by week. Accordingly, in Table 4 all sales that took place during the same week having the same product and promotion code are combined. As can be observed, in Tables 3 and 4, the dollar sales and unit sales are summed up and the price of the product is inferred from the sums by dividing the summed dollar sales by the summed number of units sold.

TABLE 2

T-Log data for a given store, product

| Transaction | Store | Time (day) | Product | Price | Promotion | Units | Dollar Sales |
|---|---|---|---|---|---|---|---|
| 1 | A | 1 | P1 | 2.35 | 2 | 6 | 14.1 |
| 2 | A | 1 | P1 | 3.45 | 1 | 3 | 10.35 |
| 3 | A | 3 | P1 | 3.05 | 1 | 1 | 3.05 |
| 4 | A | 3 | P1 | 3.05 | 1 | 5 | 15.25 |
| 5 | A | 3 | P1 | 2.35 | 2 | 3 | 7.05 |
| 6 | A | 8 | P1 | 2.35 | 2 | 7 | 16.45 |

TABLE 2-continued

T-Log data for a given store, product

| Transaction | Store | Time (day) | Product | Price | Promotion | Units | Dollar Sales |
|---|---|---|---|---|---|---|---|
| 7 | A | 11 | P1 | 2.65 | 2 | 1 | 2.65 |
| 8 | A | 11 | P1 | 3.55 | 1 | 3 | 10.65 |
| 9 | A | 11 | P1 | 3.55 | 1 | 1 | 3.55 |

TABLE 3

T-Log aggregated by day

| Store | Time (Day) | Product | Promotion | Dollar Sales | Units Sold | Inferred Price |
|---|---|---|---|---|---|---|
| A | 1 | P1 | 1 | 10.35 | 3 | 3.45 |
| A | 1 | P1 | 2 | 14.1 | 6 | 2.35 |
| A | 3 | P1 | 1 | 18.3 | 6 | 3.05 |
| A | 3 | P1 | 2 | 7.05 | 3 | 2.35 |
| A | 8 | P1 | 2 | 16.45 | 7 | 2.35 |
| A | 11 | P1 | 1 | 14.2 | 4 | 3.55 |
| A | 11 | P1 | 2 | 2.65 | 1 | 2.65 |

TABLE 4

T-Log aggregated by week

| Store | Time (Week) | Product | Promotion | Dollar Sales | Units Sold | Inferred Price |
|---|---|---|---|---|---|---|
| A | 1 | P1 | 1 | 28.65 | 9 | 3.18 |
| A | 1 | P1 | 2 | 21.15 | 9 | 2.35 |
| A | 2 | P1 | 1 | 14.2 | 4 | 3.55 |
| A | 2 | P1 | 2 | 19.1 | 8 | 2.39 |

Before modeling the data, however, the data may be further aggregated along one or more additional dimensions to ensure that the final modeling process is efficient. For example, the data may first be aggregated by week. In a second aggregation, the data may be further aggregated by store or store group. The resulting aggregated data set describes sales during a particular week over all stores belonging to a retail chain and may be modeled by any suitable modeling method.

Table 5 shows T-LOG 16 aggregated by week for each store. Table 6 shows the data in Table 5 aggregated over a group of stores.

TABLE 5

Weekly aggregated sales data by week

| Store | Time (Week) | Product | Promotion | Dollar Sales | Units Sold | Inferred Price |
|---|---|---|---|---|---|---|
| A | 1 | P1 | 1 | 28.65 | 9 | 3.18 |
| A | 1 | P1 | 2 | 21.15 | 9 | 2.35 |
| A | 2 | P1 | 1 | 14.2 | 4 | 3.55 |
| A | 2 | P1 | 2 | 19.1 | 8 | 2.39 |
| B | 1 | P1 | 1 | 24.93 | 10 | 2.49 |
| B | 1 | P1 | 2 | 32.45 | 14 | 2.32 |
| B | 2 | P1 | 1 | 35.78 | 12 | 2.98 |
| B | 2 | P1 | 2 | 12.23 | 4 | 3.06 |
| C | 1 | P1 | 1 | 23.45 | 9 | 2.61 |
| C | 1 | P1 | 2 | 32.12 | 12 | 2.68 |
| C | 2 | P1 | 1 | 11.45 | 3 | 3.82 |
| C | 2 | P1 | 2 | 21.34 | 6 | 3.56 |

TABLE 6

Weekly aggregated sales data aggregated along store dimension

| Store Group | Time (Week) | Product | Promotion | Dollar Sales | Unit Sales | Inferred Price |
|---|---|---|---|---|---|---|
| AB | 1 | P1 | 1 | 53.58 | 19 | 2.82 |
| AB | 1 | P1 | 2 | 53.6 | 23 | 2.33 |
| AB | 2 | P1 | 1 | 49.98 | 16 | 3.12 |
| AB | 2 | P1 | 2 | 31.33 | 12 | 2.61 |
| C | 1 | P1 | 1 | 23.45 | 9 | 2.61 |
| C | 1 | P1 | 2 | 32.12 | 12 | 2.68 |
| C | 2 | P1 | 1 | 11.45 | 3 | 3.82 |
| C | 2 | P1 | 2 | 21.34 | 6 | 3.56 |

Having been aggregated a second time, T-LOG 16 can be modeled using any suitable model or equation. The resulting model can then be used for any suitable application such as forecasting future sales, determining inventory replenishment metrics, price optimization, markdown optimization, promotion optimization, and merchandize and assortment planning and optimization.

Generally, aggregating T-LOG 16 along one or more dimension facilitates modeling, however the aggregation techniques often create inaccuracies in the aggregated data and resulting model. For example, the aggregation may mask errors that were present in the raw T-LOG 16 data, allocate false weight to one set of values over another, or cause useful information contained within the raw T-LOG 16 data to be lost.

When aggregating over multiple price points, some useful data relating to each of the aggregated transactions may be hidden and become inaccessible to the models. Furthermore, because the data is collected together and then summarized, it may not be possible to determine some of the original data values associated with a single transaction.

In Table 2, for example, product P1 is available in store A during week 1 at promotion 1 at prices $3.45 and $3.05 on days 1-3. However, when the data is aggregated by week in Table 4, the prices at which the products originally sold is not available. The aggregated data only shows that product P1 sold 9 units during week 1 at store A at promotion 1 at a price of $3.18. Similarly, when data is aggregated by week, the days a particular promotion was in effect in not available.

Consider Table 7 that shows T-LOG 16 for Store A during week 1. Product P1 was made available at promotion 1 at the store during days 1, 2, 3, 4, and 5 and at promotion 2 during days 6, and 7. Table 8 shows the same data aggregated by week. From the Table 8 data, it is difficult to determine whether product P1 was made available with both promotions 1 and 2 for the entire week, or whether the promotions were only available on particular days of the week. As a result, an estimate of $\tau$ for promotion 2 (the number of customers who had access to the product when promotion 2 was in effect) based on the aggregated data would be the total number of transactions at Store A during the entire week. This result is false, because we know from the raw T-LOG 16 depicted in Table 7 that promotion 2 was only available on days 6, and 7.

TABLE 7

T-Log for store A, product P1, week 1

| Transaction | Store | Time (day) | Product | Price | Promotion | Units | Dollar Sales |
|---|---|---|---|---|---|---|---|
| 1 | A | 1 | P1 | 3.25 | 1 | 2 | 6.5 |
| 2 | A | 1 | P1 | 3.25 | 1 | 2 | 6.5 |

TABLE 7-continued

T-Log for store A, product P1, week 1

| Transaction | Store | Time (day) | Product | Price | Promotion | Units | Dollar Sales |
|---|---|---|---|---|---|---|---|
| 3 | A | 3 | P1 | 3.25 | 1 | 1 | 3.25 |
| 4 | A | 5 | P1 | 3.25 | 1 | 1 | 3.25 |
| 5 | A | 6 | P1 | 2.35 | 2 | 3 | 7.05 |
| 6 | A | 6 | P1 | 2.35 | 2 | 7 | 16.45 |
| 7 | A | 7 | P1 | 2.35 | 2 | 1 | 2.35 |
| 8 | A | 7 | P1 | 2.35 | 2 | 3 | 7.05 |
| 9 | A | 7 | P1 | 2.35 | 2 | 1 | 2.35 |

TABLE 8

Aggregated T-Log for store A, product P1, week 1

| Store | Time (Week) | Product | Promotion | Dollar Sales | Units Sold | Inferred Price |
|---|---|---|---|---|---|---|
| A | 1 | P1 | 1 | 19.5 | 6 | 3.25 |
| A | 1 | P1 | 2 | 35.25 | 15 | 2.35 |

Finally, even if it was known that promotion 2 was only available on days 6, and 7, it is still difficult to determine $\tau$ for promotion 2 from Table 8 because it is difficult to determine the total number of transactions that occurred during days 6 and 7.

When T-LOG 16 is aggregated it also becomes difficult to determine whether the number of sales of a product has been artificially reduced because the product was out of stock. When T-LOG 16 is aggregated by week, a single sale during the week may be interpreted to mean that the product was in stock for the entire week. However, when looking at individual entries in T-LOG 16, if the product records zero sales for a few days—and that number of sales is far below the product's average rate of sale—then it may be assumed that the product was out of stock during the zero-sale days.

In Table 9, store A sold 9 units of product P1 on day 1, 9 units of product P1 on day 2, 9 units on day 6 and 5 units on day 7. It sold no units of product P1 on days 3, 4 and 5. Because the sale of zero items on days 3, 4, and 5 is far below the product's normal rate of sales, the product was probably out of stock during days 3, 4, and 5. However, a review of the weekly aggregated T-LOG 16 data shown in Table 10 only shows that store A sold 32 units during week 1. From the aggregated data it is difficult to determine whether product P1 was ever out of stock during week 1.

TABLE 9

Out of Stock example - T-Log data

| Transaction | Store | Time (day) | Product | Price | Promotion | Units | Dollar Sales |
|---|---|---|---|---|---|---|---|
| 1 | A | 1 | P1 | 2.35 | 1 | 6 | 14.1 |
| 2 | A | 1 | P1 | 2.35 | 1 | 3 | 7.05 |
| 3 | A | 2 | P1 | 2.35 | 1 | 4 | 9.4 |
| 4 | A | 2 | P1 | 2.35 | 1 | 5 | 11.75 |
| 5 | A | 6 | P1 | 2.35 | 1 | 2 | 4.7 |
| 6 | A | 6 | P1 | 2.35 | 1 | 7 | 16.45 |
| 7 | A | 7 | P1 | 2.35 | 1 | 5 | 11.75 |

TABLE 10

Out of Stock example - Weekly Aggregated T-Log

| Store | Time (Week) | Product | Promotion | Dollar Sales | Units | Inferred Price |
|---|---|---|---|---|---|---|
| A | 1 | P1 | 1 | 75.2 | 32 | 2.35 |

Because information may be lost at all steps of data aggregation, the all-commodity volume (ACV) for a particular collection of stores may be calculated in an attempt to extract and retain valuable information from T-LOG 16 or aggregated T-LOG 16 before data re-aggregation and modeling. ACV is a mathematical metric that is used to measure the availability of a product among a collection of stores. The ACV weighted distribution is computed as:

$$ACV \text{ weighted distribution} = \frac{\sum \text{Total sales of stores recording sales of product during time period}}{\sum \text{Total sales of all stores during time period}} \quad (5)$$

Because all products may not be available uniformly at all stores in a chain, product prices and promotions will likely be different at different stores. Because the availability of particular prices and promotions vary throughout a chain, if T-LOG 16 is aggregated by store group, it becomes difficult to determine τ, the constrained traffic, for a particular product and promotion if the identical offering is not made at all stores for the identical period of time. One store of the enterprise might stock more grocery products, whereas another store of the same enterprise might stock more automotive goods. In such a case, it would be difficult to determine a meaningful value of τ for any one of the grocery products across all stores because the grocery products are not similarly available at all stores. Accordingly, an event such as the offering of a product at a particular price and having a particular promotion might occur at only a subset of the store group making accurate analysis of the aggregated data set difficult.

Accordingly, in conventional aggregation methods the ACV is used in an attempt to assign weights to the different stores for particular products so that τ can be more accurately estimated. If the event occurs at a high sales store, then the ACV may be used to allocate additional weight to the value of τ for the high-volume store. Similarly, the ACV may be used to allocate a lower weight to the value of τ for the low-volume stores.

However, as applied, the ACV does not take into account the number of sales of the particular product and, accordingly, does not result in an accurate adjustment for each product sold. With reference to Table 11, store A is a large retail store with many products and high weekly sales. Conversely, stores B and C are more specialized and have lower overall sales. Although selling fewer products, stores B and C sell a significant volume of product P1 and a minimal volume of product P2. Store A sells product P2, however its sales are only a small proportion of total sales. From Table 11, therefore, it is apparent that product P1 has a greater contribution to total sales than product P2. However, the ACV weighted distribution of product P2 is $$\frac{100,000}{100,000 + 20,000 + 25,000} = 0.69$$

which is much higher than the ACV weighted distribution of product P1 which is $$\frac{20,000 + 25,000}{100,000 + 20,000 + 25,0000} = 0.31.$$

Accordingly, the use of overall store sales is not a useful measure for weighting the aggregated T-LOG 16 data with respect to sales of particular products. Note also that if product P1 was available in store A, the ACV weighted distribution of product P1 would be 1, greatly skewing the resulting data set and model.

TABLE 11

ACV Example - Stores selling product P1 and product P2 during week 1

| Store | A | B | C |
|---|---|---|---|
| Total Sales during current week | 100,000 | 20,000 | 25,000 |
| Sale of Product P1 occurred during current week | No | Yes | Yes |
| Sales of Product P1 as a Fraction of Total Sales during current week | 0 | 0.1 | 0.2 |
| Sale of Product P2 occurred during current week | Yes | No | No |
| Sales of Product P2 as a Fraction of Total Sales during current week | 0.01 | 0 | 0 |

For low volume products, ACV could be significantly skewed because the product may not have sold in several stores during a week. If no sales were made, ACV calculations would ignore those stores where no sales were made. Accordingly, after ACV weighting, the aggregated data would reflect an incorrect availability of the product.

When modeling T-LOG 16, whether aggregated or not, it may be necessary to first cleanse the data. Data cleansing involves the removal of erroneous or anomalous data from the data set. These errors may result from improper data entry at the point of sale, or improper pricing or promotions in the aisle, or anomalous events such as floods, hurricanes and other natural events that may cause sudden increases or decreases in sales. Man-made events such as sporting events or festivals may also result in sudden increases or decreases in sales.

Because data aggregation often results in the loss of information, cleansing performed after aggregation may be less effective than cleansing performed before aggregation. If the information that was lost during aggregation indicated an error was present in T-LOG 16, cleansing after aggregation may fail to remove the error. If the error is undetected during cleansing, the model used to analyze the aggregated T-LOG 16 data may be rendered inaccurate.

The aggregation of T-LOG 16 may make it difficult to detect and correct an error resulting from inaccurate data entry or pricing. With reference to Table 12, it appears that there was a pricing mistake or a typing mistake when transaction 5 was originally entered and the price was entered as $23.5 instead of $2.35. However, with reference to Table 13 that shows T-LOG 16 of Table 12 aggregated by week, the error is disguised; it is now difficult to determine whether there was a pricing error and, if so, the extent of the error. Furthermore, not only does the data error become hidden due to aggregation, but the resulting data is also inaccurate; Table 13 shows 29 units that sold at a price of $3.81. That price is incorrect as it is based upon the original error in data entry and will result in inaccurate modeling. Similar mistakes in unit sales, dollar sales or promotions that can be readily identified in raw T-LOG 16 data may be difficult to detect when aggregated data is analyzed.

TABLE 12

Price mistake example - T-Log data

| Transaction | Store | Time (Day) | Product | Price | Promotion | Units | Dollar Sales |
|---|---|---|---|---|---|---|---|
| 1 | A | 1 | P1 | 2.35 | 1 | 6 | 14.1 |
| 2 | A | 1 | P1 | 2.35 | 1 | 3 | 7.05 |
| 3 | A | 2 | P1 | 2.35 | 1 | 1 | 2.35 |
| 4 | A | 3 | P1 | 2.35 | 1 | 5 | 11.75 |
| 5 | A | 4 | P1 | 23.5 | 1 | 2 | 47 |
| 6 | A | 6 | P1 | 2.35 | 1 | 7 | 16.45 |
| 7 | A | 6 | P1 | 2.35 | 1 | 1 | 2.35 |
| 8 | A | 7 | P1 | 2.35 | 1 | 3 | 7.05 |
| 9 | A | 7 | P1 | 2.35 | 1 | 1 | 2.35 |

TABLE 13

Price Mistake Example - Weekly Aggregated T-Log

| Store | Time (Week) | Product | Promotion | Dollar Sales | Units Sold | Inferred Price |
|---|---|---|---|---|---|---|
| A | 1 | P1 | 1 | 110.45 | 29 | 3.81 |

Other types of data inaccuracies may result from a sudden and anomalous increase or decrease in sales due to storm warnings or special events which might increase customer traffic to a store. Because these are anomalous events, they will often be identified as errors, and removed from the dataset so as to not affect the model. In Table 14, product P1 sold 6 units in store A on day 1, 3 units on day 2, 18 units on day 3, 1 unit on day 4, 0 units on day 5, 2 units on day 6 and 3 units on day 7. The large increase on day 3 was due to a storm warning that was issued for day 4. If the raw T-LOG 16 data was available, it is possible to detect the large increase in sales and remove the anomalous increase from the resulting model. However, the anomaly is difficult to detect by reviewing the aggregated T-LOG 16 data depicted in Table 15 because all sales throughout the week have been combined and the combination hides the great increase of sales on day 3.

TABLE 14

Increased sales example - T-Log data

| Transaction | Store | Time (day) | Product | Price | Promotion | Units | Dollar Sales |
|---|---|---|---|---|---|---|---|
| 1 | A | 1 | P1 | 2.35 | 1 | 6 | 14.1 |
| 2 | A | 2 | P1 | 2.35 | 1 | 3 | 7.05 |
| 3 | A | 3 | P1 | 2.35 | 1 | 1 | 2.35 |
| 4 | A | 3 | P1 | 2.35 | 1 | 2 | 4.7 |
| 5 | A | 3 | P1 | 2.35 | 1 | 2 | 4.7 |
| 6 | A | 3 | P1 | 2.35 | 1 | 7 | 16.45 |
| 7 | A | 3 | P1 | 2.35 | 1 | 3 | 7.05 |
| 8 | A | 3 | P1 | 2.35 | 1 | 3 | 7.05 |
| 9 | A | 4 | P1 | 2.35 | 1 | 1 | 2.35 |
| 9 | A | 6 | P1 | 2.35 | 1 | 2 | 4.7 |
| 9 | A | 7 | P1 | 2.35 | 1 | 3 | 7.05 |

TABLE 15

Increased sales example - Weekly aggregated T-Log

| Store | Time (Week) | Product | Promotion | Dollar Sales | Units Sold | Inferred Price |
|---|---|---|---|---|---|---|
| A | 1 | P1 | 1 | 77.55 | 33 | 2.35 |

Data cleansing problems may also arise due to the difficulty of determining when particular promotional efforts were in effect. Many retailers 10 do not keep exact promotion information and different stores may implement promotions on different days. T-LOG 16 for some retailers 10 might not even contain promotion information.

In Table 16, retailer 10 did not provide accurate promotion information. Although the promotion calendar for retailer 10 stated that promotion 1 was in effect on days 1-3 and promotion 2 was in effect on days 4-7, Table 16, which contains the raw T-LOG 16 data, shows that even on days 2 and 3, promotion 2 was in effect at store A and product P1 sold at the promotional price of $2.05. This error is difficult to detect based upon the weekly aggregated T-LOG 16 data shown in Table 17.

TABLE 16

Promotion inference example - T-Log data

| Transaction | Store | Time (Day) | Product | Price | Promotion | Units | Dollar Sales |
|---|---|---|---|---|---|---|---|
| 1 | A | 1 | P1 | 2.35 | 1 | 6 | 14.1 |
| 2 | A | 1 | P1 | 2.35 | 1 | 3 | 7.05 |
| 3 | A | 2 | P1 | 2.05 | 1 | 4 | 8.2 |
| 4 | A | 3 | P1 | 2.05 | 1 | 5 | 10.25 |
| 5 | A | 4 | P1 | 2.05 | 2 | 2 | 4.1 |
| 6 | A | 5 | P1 | 2.05 | 2 | 7 | 14.35 |
| 7 | A | 6 | P1 | 2.05 | 2 | 1 | 2.05 |
| 8 | A | 7 | P1 | 2.05 | 2 | 3 | 6.15 |
| 9 | A | 7 | P1 | 2.05 | 2 | 1 | 2.05 |

TABLE 17

Promotion inference example - Weekly aggregated T-Log

| Store | Time (Week) | Product | Promotion | Dollar Sales | Units Sold | Inferred Price |
|---|---|---|---|---|---|---|
| A | 1 | P1 | 1 | 39.6 | 18 | 2.20 |
| A | 1 | P1 | 2 | 28.7 | 14 | 2.05 |

In the following discussion, a novel system for cleansing and aggregating data is presented. The system integrates the general mathematical principles described above with additional novel steps to minimize data loss and increase the efficiency and accuracy of data modeling. The discussion includes several examples that do not limit the scope of the present system; the system may cleanse and aggregate any appropriate data set and its steps may be executed in any order.

In the present embodiment, T-LOG 16 data is cleansed in T-LOG data cleansing 22 before it is aggregated in T-LOG data aggregation 24. Accordingly, many of the data errors or anomalies that are difficult to detect using the cleansing methods described above are detected and may be removed from the data set before aggregation. T-LOG data cleansing 22 is described in a series of steps. The steps may be performed in any order depending upon the application. In some embodiments, steps may be skipped. If there is a minimal probability that one particular category of data error exists or one type of error is considered immaterial, the step for detecting and cleansing that type of error may be skipped.

In the present embodiment, the first step of T-LOG data cleansing 22 involves flagging outlier or erroneous transactions based upon price, unit sales, cost, or dollar sales. This step detects and removes mistakes created during the generation of T-LOG 16. To detect errors, each entry in the raw T-LOG 16 data is reviewed individually. If the price observed deviates more than k standard deviations from the average price of that product on that day, then the transaction is flagged and will not be considered for modeling. The value k is a parameter that can be tailored for specific applications. If the accuracy of T-LOG 16 is more important than the volume of data available for analysis, then k may be set to a relatively low threshold. A similar strategy may be used to detect outlier data resulting from data-entry mistakes in units sold, cost, dollar sales or any other value in T-LOG 16.

In a second step of T-LOG data cleansing 22, the raw T-LOG 16 data is analyzed to determine when particular promotional efforts were in effect. In Table 16, even though retailer 10 provided a promotional calendar that stated promotion 2 at store A would begin on day 4, the data shows that the promotional price of $2.05 was available on days 2 and 3 as well, indicating that the promotion ran for too many days. In the present embodiment, the time period during which particular promotional efforts were in effect may be determined by analyzing the price at which units of product sold at a particular time. If the price matches a particular promotional effort, then the promotional effort is assumed to have been in effect at the time the product was sold.

In a third step, T-LOG data cleansing 22 determines whether a particular product was out-of-stock, or whether there were no sales of the product over a given period of time. If zero sales are observed for a product at a store during a particular day, it does not necessarily mean that the product was out-of-stock as the lack of sales could also have occurred due to low demand for the product.

To determine whether a product was out-of-stock, therefore, a probabilistic distribution for the number of sales of the product at a store for a given time period is first determined. Based upon the probabilistic distribution, and the number of transactions at the store over the period of time in question, the probability that there were no sales over the period of time in question can be determined. If the probability that there were no sales is below a pre-defined threshold value, it is assumed that the product was out-of-stock. Using this method, it is possible to determine all time periods during which a particular product was out-of-stock at a particular store.

The out-of-stock status (OOS) for a product at a store during a given time period is indicated by $OOS_{t,s}^p$ where p is the product, t is the time period and s is the store. For a given product, store, and time, OOS values will be either 1 or 0.

When a product is out-of-stock, other data aggregation and cleansing systems may specify that the product had zero sales during the out-of-stock time period and then continue with modeling. However, such a blanket rule results in inaccurate modeling because a lack of sales is not necessarily the same thing as a product being out-of-stock. If such a rule is employed, a store that sells a product at such high volume that it is regularly out-of-stock may be modeled as a store having only average sales because, on many days of the week, it is modeled as having zero sales of the product. Accordingly, if out-of-stock products are modeled as having zero sales, their replenishment may be delayed because other stores having consistent sales (but that never go out-of-stock) may receive additional re-stock first because they are believed to have a higher rate of sale.

Having removed erroneous data and determined whether a product has zero sales or is out-of-stock, T-LOG 16 is aggregated by day. The system then flags and removes all transactions during a single day for which the total dollar sales or total unit sales on that day at that store are more than r standard deviations from some comparative value. The total dollar sales or total unit sales may be compared against the average sales per day at that store over the current week, total sales at that store on the same day last season, or the total sales at that store one week earlier. Additional comparative values may include sales during the same week last year, sales during the same week at another store, or an average value of all sales during the same week at all stores.

This step flags extraordinarily high or low sales occurring at a store that might be due to non-reoccurring events such as storms or significant sporting events. In Table 14, sales were very high during day 3. Using this method, it may be inferred that the high number of sales were due to some anomalous event such as a forecasted thunderstorm.

In the present embodiment, r may be tailored to the particular application. If the stores are in a market where anomalous events occur relatively frequently, r may be assigned a relatively high value so that the models can take into account some of the data generated by the anomalous events. Alternatively, in extremely stable markets, r may be set to a relatively low value so that most of the data resulting from anomalous events are removed from T-LOG 16.

After cleansing T-LOG 16 in step 22 on FIG. 2, T-LOG data aggregation 24 is used to compress the raw T-LOG 16 data for efficient and accurate modeling. T-LOG 16 can be aggregated along the dimensions store, time and customer, or any other combination of available dimensions. T-LOG data aggregation 24 is described in a series of steps. The steps may be performed in any order depending upon the application. In some embodiments, steps may be skipped.

In the present embodiment, T-LOG data aggregation 24 includes first calculating for each store and each time period, the number of customers 14 or customer categories of each type who had a transaction in that store. This value is referenced as $T_{c,t,s}$. T may be determined by adding up the number of customers 14 or customer categories that are associated with entries in T-LOG 16 for each store and each time period.

In a second step, the availability of a product at a particular store, time, and customer dimension at a specified price, promotion, and merchandising is determined. The availability is called $Av_{c,t,s,pri,pro,m}^p$. Availability has two components:

First, price, promotion and merchandising combinations for a product might only be available at certain stores at certain times for certain customers 14. The price and merchandising information is available from T-LOG 16 and the corrected promotion information was determined during T-LOG data cleansing 22. The availability of the product at a specific price, promotion, and merchandizing combination at a given store, time, and customer dimension is indicated by $I_{c,t,s,pri,pro,m}^p$. I is either 1 or 0 for a given product, customer type, time, store, price and promotion. With reference to Table 2 that shows T-LOG 16 for Store A, the availability of product P1 at price $2.35 and promotion 2 on day 1 is 1, the availability of product P1 at price $3.05 and promotion 1 on day 1 is 0, and the availability of product P1 at price $3.05 and promotion 1 on day 3 is 1.

Second, a product may have been out-of-stock at a store on a given day. This will also affect the availability of the product. OOS was calculated during T-LOG data cleansing 22. If a product is available, it is referred to as In-Stock or $IS_{t,s}^P$. A product's in-stock status (IS) is the inverse of its OOS: $IS_{t,s}^P = 1 - OOS_{t,s}^P$. Note that $OOS_{t,s}^P$ was calculated during T-LOG data cleansing 22.

With these two values, availability of a product is calculated as:

$$Av_{c,t,s,pri,pro,m}^P = I_{c,t,s,pri,pro,m}^P \times IS_{t,s}^P \quad (6)$$

Because both I and IS are either 1 or 0, the availability value Av will also be 1 or 0 for a given product, customer, time, store, price, promotion and merchandizing.

Having calculated Av, T-LOG 16 can be aggregated to the required level of aggregation along one or more of its dimensions. This aggregation process separates entries by price point and determines the units sold of a product in an aggregated time group, aggregated store group and aggregated customer group at a specific price, promotion and merchandising.

The results of the present aggregation scheme as applied to the data of Table 2 are shown in Table 18. Table 18 shows aggregation of the data in Table 2 to the week, and store dimension group. Note that the aggregation differentiates the different price points instead of aggregating across them as was seen in Table 3.

TABLE 18

Aggregated T-Log under the Scientific T-Log Compression Process

| Store | Time (week) | Product | Price | Promotion | Units |
|---|---|---|---|---|---|
| A | 1 | P1 | 2.35 | 2 | 6 |
| A | 1 | P1 | 3.45 | 1 | 3 |
| A | 1 | P1 | 3.05 | 1 | 6 |
| A | 1 | P1 | 2.35 | 2 | 3 |
| A | 2 | P1 | 2.35 | 2 | 7 |
| A | 2 | P1 | 2.65 | 2 | 1 |
| A | 2 | P1 | 3.55 | 1 | 4 |

Based upon the traffic and availability information, the number of customers who could have bought the product at the specific price, promotion and merchandising at the dimension customer group, time group, and store group is expressed in equation (7). This is a precise value of τ, so in the present embodiment τ can be calculated for a product, customer group, time group, store group, price, promotion and merchandising as $$\tau_{p,cg,sg,tg,pri,pro,m} = \sum_{t \in tg, s \in sg, c \in cg} T_{c,t,s} \times Av_{c,t,s,pri,pro,m}^P \quad (7)$$

Finally, using the historical values of τ for the aggregated dimension group calculated above, and the historical values of unit sales for the aggregated dimension group calculated above, the parameters for g in equation (4) may be calculated. Here, the parameter values for g are estimated using all the sets of price, promotion, and merchandising combinations for a particular product in a particular dimension group.

Historical values of $T_{c,t,s}$ can be further used to forecast future values of $T_{c,t,s}$ for any set of dimensions time, store and customer. This could be done by using exponential smoothing or any other suitable forecasting method.

With the T-LOG 16 data compressed, the forecast values of $T_{c,t,s}$ and the parameter values in g may be used to model the aggregated T-LOG 16 data and make market predictions. Given a specific price, promotion and merchandising, sales of a product in a specified dimensional space can be forecasted. Furthermore, optimal decisions on pricing, promotion, and merchandising can be made.

Figure 4:
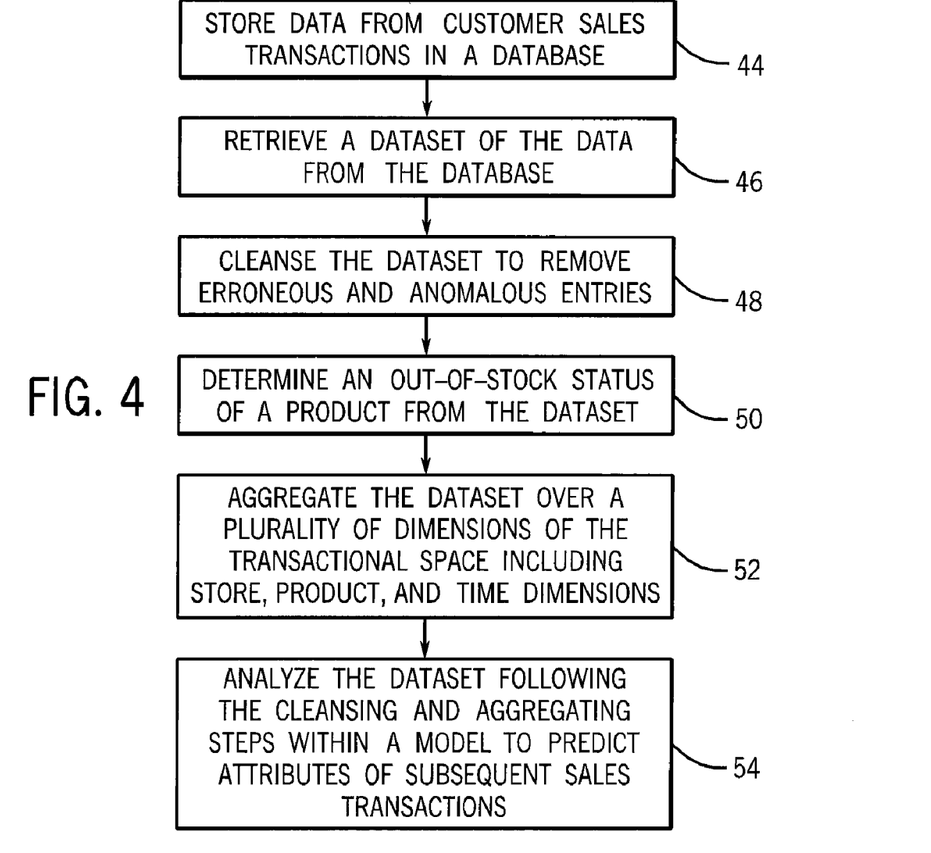
FIG. 4 is a process of cleansing and aggregating transaction log data.

As further explanation, FIG. 4 illustrates a process flowchart of one embodiment of the data cleansing and aggregation process. Step 44 stores data from customer sales transactions in a database. Step 46 retrieves a dataset of the data from the database. The dataset may include promotion and merchandizing entries. Step 48 cleanses the dataset to remove erroneous and anomalous entries. Cleansing the dataset may include determining a threshold value from the dataset and determining whether a value of the dataset exceeds the threshold value. Step 50 determines an out-of-stock status for a product from the dataset. Determining the out-of-stock status includes determining a probable number of sales of a product from the dataset, determining an actual number of sales of a product from the dataset, and comparing the actual number of sales of a product to the probable number of sales of a product. Step 52 aggregates the dataset over a plurality of dimensions of the transactional space including store, product, and time dimensions. Aggregating the dataset may involve summing entries from the dataset within the same dimensional space. Step 54 analyzes the dataset following cleansing step 48 and aggregation step 52 within a model to predict attributes of subsequent sales transactions. The model may include a function of a number of customers who had access to a product at a point within the transactional space and sales per customer at the point within the transactional space. Analysis of the dataset may also include determining a historical number of customers for a given store and a given time from the dataset, and forecasting a future number of customers for a given store and a given time from the historical number of customers for a given store and a given time using exponential smoothing techniques. Finally, analysis of the dataset may include predicting sales of a product given a price, promotion and merchandizing, and determining an optimal price for a product.

While one or more embodiments of the present invention have been illustrated in detail, the skilled artisan will appreciate that modifications and adaptations to those embodiments may be made without departing from the scope of the present invention as set forth in the following claims.

What is claimed is:

1. A computer-implemented method of preparing data for modeling, comprising:
   storing data from customer sales transactions in a database;
   retrieving a dataset of the data from the database;
   cleansing, by a computer, the dataset to remove erroneous and anomalous entries;
   aggregating the dataset over a plurality of dimensions of the transactional space including store, product, and time dimensions; and
   analyzing the dataset following the cleansing and aggregating steps within a model to predict attributes of subsequent sales transactions;
   wherein the cleansing the dataset includes determining an out-of-stock status of a product from the dataset;
   wherein the determining an out-of-stock status of a product from the dataset includes:
      determining a probable number of sales of a product from the dataset;
      determining an actual number of sales of a product from the dataset; and
      comparing the actual number of sales of a product to the probable number of sales of a product; and
   wherein the aggregating the dataset over a plurality of dimensions of the transactional space including store, product, and time dimensions includes calculating, for each store and each time period, a number of customers or customer categories of each type who had a transaction in that store.

2. The computer implemented method of claim 1, wherein the model includes a function of a number of customers who had access to a product at a point within the transactional space and sales per customer at the point within the transactional space.

3. The computer implemented method of claim 1, wherein aggregating the dataset involves summing entries from the dataset within the same dimensional space.

4. The computer implemented method of claim 1, wherein the dataset further includes promotion and merchandizing entries.

5. The computer implemented method of claim 1, wherein cleansing the dataset includes:
   determining a threshold value from the dataset; and
   determining whether a value of the dataset exceeds the threshold value.

6. The computer implemented method of claim 1, including:
   determining a historical number of customers for a given store and a given time from the dataset; and
   forecasting a future number of customers for a given store and a given time from the historical number of customers for a given store and a given time using exponential smoothing techniques.

7. The computer implemented method of claim 1, wherein analyzing the dataset includes predicting sales of a product given a price, promotion and merchandizing.

8. The computer implemented method of claim 1, wherein analyzing the dataset includes determining an optimal price for a product.

9. A method of preparing data for modeling, comprising:
   retrieving a dataset from a database, wherein the dataset includes data from customer sales transactions;
   cleansing, by a computer, the dataset to remove erroneous and anomalous entries;
   aggregating the dataset over a plurality of dimensions of the transactional space including store, product, and time dimensions; and
   transmitting the dataset to a modeling system, wherein the modeling system predicts attributes of subsequent sales transactions;
   wherein the cleansing the dataset includes determining an out-of-stock status of a product from the dataset;
   wherein the determining an out-of-stock status of a product from the dataset includes:
      determining a probable number of sales of a product from the dataset;
      determining an actual number of sales of a product from the dataset; and
      comparing the actual number of sales of a product to the probable number of sales of a product; and
   wherein the aggregating the dataset over a plurality of dimensions of the transactional space including store, product, and time dimensions includes calculating, for each store and each time period, a number of customers or customer categories of each type who had a transaction in that store.

10. The method of claim 9, wherein the modeling system includes a function of a number of customers who had access to a product at a point within the transactional space and sales per customer at the point within the transactional space.

11. The method of claim 9, wherein cleansing the dataset includes:
   determining a threshold value from the dataset; and
   determining whether a value of the dataset exceeds the threshold value.

12. The method of claim 9, wherein the modeling system predicts sales of a product given a price, promotion and merchandizing.

13. The method of claim 9, wherein the modeling system determines an optimal price for a product.

14. A computer program product usable with a programmable computer processor, the computer program product having a non-transitory computer readable medium having computer readable program code embodied therein, the computer readable program code comprising:
   computer readable program code which stores data from customer sales transactions in a database;
   computer readable program code which retrieves a dataset of the data from the database;
   computer readable program code which cleanses the dataset to remove erroneous and anomalous entries;
   computer readable program code which aggregates the dataset over a plurality of dimensions of the transactional space including store, product, and time dimensions; and
   computer readable program code which analyzes the dataset within a model to predict attributes of subsequent sales transactions;
   wherein the computer readable program code which cleanses the dataset to remove erroneous and anomalous entries includes computer readable program code which determines an out-of-stock status of a product from the dataset; and
   wherein the computer readable program code which determines an out-of-stock status of a product from the dataset includes:
      computer readable program code which determines a probable number of sales of a product from the dataset;
      computer readable program code which determines an actual number of sales of a product from the dataset; and
      computer readable program code which compares the actual number of sales of a product to the probable number of sales of a product; and
   wherein the computer readable program code which aggregates the dataset over a plurality of dimensions of the transactional space including store, product, and time dimensions includes computer readable program code which calculates, for each store and each time period, a number of customers or customer categories of each type who had a transaction in that store.

15. The computer program product of claim 14, wherein the computer readable program code which analyzes the dataset within a model includes computer readable program code which determines an optimal price for a product.

16. A system for manipulating data, comprising:
   a computer system comprising:
      means for retrieving a dataset from a database, wherein the dataset includes data from customer sales transactions;
      means for cleansing the dataset to remove erroneous and anomalous entries;
      means for aggregating the dataset over a plurality of dimensions of the transactional space including store, product, and time dimensions; and means for transmitting the dataset to a modeling system, wherein the modeling system predicts attributes of subsequent sales transactions;

wherein the means for cleansing the dataset includes means for determining an out-of-stock status of a product from the dataset; and wherein the means for determining an out-of-stock status of a product from the dataset includes:

means for determining a probable number of sales of a product from the dataset;

means for determining an actual number of sales of a product from the dataset; and means for comparing the actual number of sales of a product to the probable number of sales of a product; and wherein the means for aggregating the dataset over a plurality of dimensions of the transactional space including store, product, and time dimensions includes means for calculating, for each store and each time period, a number of customers or customer categories of each type who had a transaction in that store.

17. The computer system of claim 16, wherein the means for cleansing the dataset includes:

means for determining a threshold value from the dataset; and means for determining whether a value of the dataset exceeds the threshold value.

18. The computer implemented method of claim 1, wherein the determining an out-of-stock status of a product from the dataset further includes:

determining that a product was out-of-stock during a time period at a particular store based on a result of the comparing the actual number of sales of a product to the probable number of sales of a product.

19. The method of claim 9, wherein the determining an out-of-stock status of a product from the dataset further includes:

determining that a product was out-of-stock during a time period at a particular store based on a result of the comparing the actual number of sales of a product to the probable number of sales of a product.

20. The computer program product of claim 14, wherein the computer readable program code which determines an out-of-stock status of a product from the dataset further includes:

computer readable program code which determines that a product was out-of-stock during a time period at a particular store based on a result of the comparing the actual number of sales of a product to the probable number of sales of a product.

21. The computer system of claim 16, wherein the means for determining an out-of-stock status of a product from the dataset further includes:

means for determining that a product was out-of-stock during a time period at a particular store based on a result of the comparing the actual number of sales of a product to the probable number of sales of a product.

22. The computer implemented method of claim 1, wherein the storing, the retrieving, the aggregating and the analyzing are performed by the computer.

23. The computer implemented method of claim 22, wherein the model includes a function of a number of customers who had access to a product at a point within the transactional space and sales per customer at the point within the transactional space.

24. The computer implemented method of claim 22, wherein aggregating the dataset involves summing entries from the dataset within the same dimensional space.

25. The computer implemented method of claim 22, wherein the dataset further includes promotion and merchandizing entries.

26. The computer implemented method of claim 22, wherein cleansing the dataset includes:

determining a threshold value from the dataset; and determining whether a value of the dataset exceeds the threshold value.

27. The computer implemented method of claim 22, including:

determining a historical number of customers for a given store and a given time from the dataset; and forecasting a future number of customers for a given store and a given time from the historical number of customers for a given store and a given time using exponential smoothing techniques.

28. The computer implemented method of claim 22, wherein analyzing the dataset includes predicting sales of a product given a price, promotion and merchandizing.

29. The computer implemented method of claim 22, wherein analyzing the dataset includes determining an optimal price for a product.

30. The computer implemented method of claim 9, wherein the storing, the retrieving, the aggregating and the analyzing are performed by the computer.

31. The method of claim 30, wherein the modeling system includes a function of a number of customers who had access to a product at a point within the transactional space and sales per customer at the point within the transactional space.

32. The method of claim 30, wherein cleansing the dataset includes:

determining a threshold value from the dataset; and determining whether a value of the dataset exceeds the threshold value.

33. The method of claim 30, wherein the modeling system predicts sales of a product given a price, promotion and merchandizing.

34. The method of claim 30, wherein the modeling system determines an optimal price for a product.

35. The computer implemented method of claim 1, wherein the cleansing the dataset further includes:

determining when particular promotional efforts were in effect; and wherein the determining when particular promotional efforts were in effect includes:

analyzing a price at which units of product sold at a particular time.

36. The method of claim 9, wherein the cleansing the dataset further includes:

determining when particular promotional efforts were in effect; and wherein the determining when particular promotional efforts were in effect includes:

analyzing a price at which units of product sold at a particular time.

37. The computer program product of claim 14, wherein the computer readable program code which cleanses the dataset to remove erroneous and anomalous entries further includes computer readable program code which determines when particular promotional efforts were in effect; and wherein the computer readable program code which determines when particular promotional efforts were in effect includes:

computer readable program code which analyzes a price at which units of product sold at a particular time.

38. The computer system of claim 16, wherein the means for cleansing the dataset further includes:
  means for determining when particular promotional efforts were in effect; and
  wherein the means for determining when particular promotional efforts were in effect includes:
    means for analyzing a price at which units of product sold at a particular time.

39. The computer implemented method of claim 1, wherein the aggregating the dataset further includes:
  determining an availability of a product at a particular store, time and customer dimension at a specified price, promotion and merchandizing.

40. The method of claim 9, wherein the aggregating the dataset further includes:
  determining an availability of a product at a particular store, time and customer dimension at a specified price, promotion and merchandizing.

41. The computer program product of claim 14, wherein the computer readable program code which aggregates the dataset further includes:
  computer readable program code which determines an availability of a product at a particular store, time and customer dimension at a specified price, promotion and merchandizing.

42. The computer system of claim 16, wherein the means for aggregating the dataset further includes:
  means for determining an availability of a product at a particular store, time and customer dimension at a specified price, promotion and merchandizing.

* * * * *